Patented May 17, 1949

2,470,424

UNITED STATES PATENT OFFICE 2,470,424

PRESERVATION OF FRUITS AND VEGETABLES

Dell Alvos, Guadalupe, Calif.

No Drawing. Application May 16, 1946,
Serial No. 670,314

5 Claims. (Cl. 99—103)

Fruits and vegetables after being taken from the tree or field tend to lose their freshness or wilt, to decay, or to otherwise deteriorate. This is particularly true of lettuce, cabbage, cauliflower, and other garden crops grown for human consumption, and, since products showing visible deterioration are usually rejected by prospective buyers, the longer these products can be kept fresh the longer they are marketable. This deterioration is particularly important in vegetables shipped long distances by truck or rail. Various expedients are now used by growers, such as icing or shipping in refrigerator cars, to prevent such deterioration.

The object of my process is to retard wilting and decay, which is usually considered as in part due to a variety of causes, for example, loss of moisture or the attacks of hostile organisms.

In the practice of my invention I first produce an alkali solution by thoroughly dissolving one-half pound of sodium carbonate ($NaCO_3$) in water. Potassium and perhaps other carbonates are effective. I then blow this alkali solution with sulphur dioxide ($SO_2$), which is a gas at atmospheric temperatures and pressures. The gas is injected into the alkali solution in such a manner as to widely diffuse it through the solution. The sulphur dioxide combines with the carbonate to release carbon dioxide and form various sulphur compounds. The resulting solution is acid, and the blowing is continued until the solution shows a definite acidity which is determined by titration using a $\frac{1}{10}$ normal solution of sodium hydroxide (NaOH). The proper acidity will be attained when three parts of the NaOH solution neutralize one part of acid solution, and this neutralization can be determined by the use of an ethyl orange indicator or litmus paper. The acid solution contains some dissolved $SO_2$ and $CO_2$ and various sulphur compounds of the base metal.

In using the acid solution, it is diluted with water in about the proportion of one-half pint of acid solution to three gallons of water to produce a wash solution. This proportion varies somewhat with the age of the acid solution and variation in acidity due to manufacturing conditions, and the above stated proportion of 1 part of acid solution to 48 parts of water will not always produce the wash solution of proper acidity. I find, therefore, that it is best to add to the water to be used for washing enough acid solution to produce a pH of 5 to 6 in the resulting wash solution, which, of course, contains some dissolved $SO_2$ and $CO_2$ and various sulphur compounds. To obtain the best results, the acid solution is produced and bottled under a pressure of 5 pounds per square inch or less and is retained under pressure until used to produce the wash solution.

The vegetable or fruit is washed in the wash solution and packed while still moist in suitable shipping containers. Many vegetables and fruit previously shipped without the use of my invention (even those shipped in refrigerator cars) from California to the eastern markets at Chicago or points east of Chicago often arrived at the eastern markets in unmarketable condition due to deterioration in transit. I have found that by the use of my wash solution transit losses due to wilting or decay are greatly reduced.

I claim as my invention:

1. A wash solution for vegetable products comprising water and the reaction products of an alkali metal carbonate, water, and sulfur dioxide, the solution having a pH between about 5.0 and 6.0.

2. A wash solution for vegetable products comprising water and the reaction products of sodium carbonate, water, and sulfur dioxide, the solution having a pH between about 5.0 and 6.0.

3. A concentrate for preparing a fruit wash solution comprising water and the reaction products of an alkali metal carbonate, water, and sulfur dioxide.

4. A concentrate for preparing a fruit wash solution comprising water and the reaction products of an alkali metal carbonate, water, and sulfur dioxide, the water and carbonate being in the relative proportion of about one gallon and one-half pound, respectively, and the sulfur dioxide reactant being in quantity to result in a concentrate which when diluted approximately 1 to 40 with water will have a pH of between about 5.0 and 6.0.

5. A concentrate for preparing a fruit wash solution comprising water and the reaction products of sodium carbonate, water, and sulfur dioxide, the water and carbonate being in the relative proportion of about one gallon and one-half pound, respectively, and the sulfur dioxide reactant being in quantity to result in a concentrate which when diluted approximately 1 to 40 with water will have a pH of between about 5.0 and 6.0.

DELL ALVOS.

REFERENCES CITED

The following references are of record in the file of this patent:

UNITED STATES PATENTS

| Number | Name | Date |
| --- | --- | --- |
| 176,754 | Mefford | May 2, 1876 |
| 2,011,465 | Balls et al. | Aug. 13, 1935 |
| 2,028,970 | Ewell | Jan. 28, 1936 |
| 2,113,782 | Coulter | Apr. 12, 1938 |
| 2,178,675 | Thomas | Nov. 7, 1939 |

FOREIGN PATENTS

| Number | Country | Date |
| --- | --- | --- |
| 20,782 | Great Britain | 1893 |
| 511,492 | Great Britain | 1939 |